US011468478B2

(12) United States Patent
Demsey et al.

(10) Patent No.: US 11,468,478 B2
(45) Date of Patent: Oct. 11, 2022

(54) REAL-TIME VIDEO AD EVALUATION

(71) Applicant: CONSUMABLE, INC., Jackson, WY (US)

(72) Inventors: Seth Mitchell Demsey, Vienna, VA (US); Michael Irvin Hyman, Bellevue, WA (US); Alexander Alexandrovych Kislitsyn, Kharkov (UA); Andrew Petroka, Baltimore, DE (US)

(73) Assignee: Consumable, Inc., Jackson, WY (US)

( * ) Notice: Subject to any disclaimer, the term of this patent is extended or adjusted under 35 U.S.C. 154(b) by 149 days.

(21) Appl. No.: 17/021,936

(22) Filed: Sep. 15, 2020

(65) Prior Publication Data

US 2020/0410542 A1 Dec. 31, 2020

Related U.S. Application Data

(63) Continuation-in-part of application No. 16/850,341, filed on Apr. 16, 2020, now Pat. No. 10,779,021, which is a continuation-in-part of application No. 16/395,561, filed on Apr. 26, 2019, now Pat. No. 10,694,226.

(60) Provisional application No. 62/836,834, filed on Apr. 22, 2019, provisional application No. 62/836,802, filed on Apr. 22, 2019.

(51) Int. Cl.
*G06Q 30/02* (2012.01)
*G06N 5/02* (2006.01)

(52) U.S. Cl.
CPC ..... *G06Q 30/0267* (2013.01); *G06Q 30/0244* (2013.01); *G06Q 30/0274* (2013.01); *G06Q 30/0276* (2013.01); *G06Q 30/0277* (2013.01); *G06N 5/022* (2013.01)

(58) Field of Classification Search
CPC .............. G06Q 30/0272; H04N 21/26241
See application file for complete search history.

(56) References Cited

U.S. PATENT DOCUMENTS

| | | | |
|---|---|---|---|
| 8,307,392 B2 | 11/2012 | Ahanger et al. | |
| 9,659,218 B1 | 5/2017 | Shetty et al. | |
| 9,973,830 B1 | 5/2018 | Shetty | |
| 10,255,608 B2 | 4/2019 | Kulkarni et al. | |
| 10,390,067 B1 | 8/2019 | Shetty et al. | |
| 2012/0130805 A1* | 5/2012 | On ............... | G06Q 30/0251 705/14.49 |
| 2013/0268963 A1 | 10/2013 | Nugent et al. | |
| 2013/0311309 A1 | 11/2013 | Napchi et al. | |

(Continued)

FOREIGN PATENT DOCUMENTS

WO 2010135002 A2 11/2010

OTHER PUBLICATIONS

Interactive Advertising Bureau, Video Player-Ad Interface Definition (VPAID) Version 2.0, Released Apr. 10, 2012, total of 58 pages.

(Continued)

*Primary Examiner* — Michael H Hong
(74) *Attorney, Agent, or Firm* — So Cal IP Law Group LLP; Steven Sereboff

(57) ABSTRACT

There are disclosed devices, system and methods for predicting a likelihood of whether digital video ads will start on a given user device using a predictive model of the user device. The predictive model simulates a start of play in the user device and determines if the digital video ad started to play.

22 Claims, 4 Drawing Sheets

(56) References Cited

U.S. PATENT DOCUMENTS

| | | | |
|---|---|---|---|
| 2014/0257968 | A1 | 9/2014 | Carncross et al. |
| 2016/0071162 | A1* | 3/2016 | Ogawa .................. G06Q 50/01 |
| | | | 705/14.66 |
| 2016/0198238 | A1 | 7/2016 | Hajuyev et al. |
| 2016/0260123 | A1 | 9/2016 | Mishra et al. |
| 2016/0345074 | A1 | 11/2016 | Serbest et al. |
| 2017/0024761 | A1 | 1/2017 | Ruiz et al. |
| 2017/0330245 | A1* | 11/2017 | Guermas ............ G06Q 30/0275 |
| 2020/0314101 | A1* | 10/2020 | Zhang .................. G06N 3/0445 |

OTHER PUBLICATIONS

Interactive Advertising Bureau, Video Ad Serving Template (VAST) Version 3.0, Published, Jul. 19, 2012, 71 total pages.

Interactive Advertising Bureau, Video Ad Serving Template (VAST) Version 4.0, Released Jan. 21, 2016, Corrections and clarifications (Section 7) added Apr. 2016, 74 total pages.

Interactive Advertising Bureau, Digital Video Ad Serving Template (VAST) Version 2.0, Released Nov. 11, 2009, 16 total pages.

Google Ads, About Target ROAS Bidding, https://support.google.com/google-ads/answer/6268637?hl=en, last accessed Jul. 27, 2020, 3 pages.

Brave Browser, "Accurately Predicting Ad Blocker Savings", Article published Oct. 21, 2019, https://brave.com/accurately-predicting-ad-blocker-savings/, last accessed Jul. 27, 2020, 19 pages.

Gharibshah et al., Deep Learning for User Interest and Response Prediction in Online Display Advertising, journal, Data Science and Engineering (2020) 5:12-26, Published Jan. 17, 2020, 15 pages.

Tammy Everts, How We Used Machine Learning to Predict Bounce and Conversion Rate, blog, published Jul. 20, 2016, https://developer.akamai.com/blog/2016/07/20/machine-learning-predicts-bound-conversions, last accessed Jul. 27, 2020, 11 pages.

Google Ads Help, Measuring reach and frequency, https://support.google.com/google-ads/answer/2472714?hl=en, last accessed Jul. 27, 2020, 3 pages.

* cited by examiner

REAL-TIME VIDEO AD EVALUATION

RELATED APPLICATION INFORMATION

This patent is a continuation-in part of application Ser. No. 16/850,341, filed Apr. 16, 2020 entitled Video Ad Delivery and Verification, now U.S. Pat. No. 10,779,021, which is incorporated herein by reference and which claims priority from Provisional Application No. 62/836,802 filed Apr. 22, 2019 entitled Enabling Measurement on Server-Side-Stitched Video Ad Insertion, and claims priority from Provisional Application No. 62/836,834 filed Apr. 22, 2019 entitled ENABLING FREQUENCY CAPPING AND CREATIVE-COMPETITIVE SEPARATION IN OTT and is a continuation-in-part of application Ser. No. 16/395,561 filed Apr. 26, 2019 entitled Video Ad Delivery, now U.S. Pat. No. 10,694,226, and is related to application Ser. No. 16/735,968 filed Jan. 7, 2020 entitled Optimized Video Ad Delivery, now U.S. Pat. No. 10,779,020.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

Field

This disclosure relates to evaluation of digital video ads in real time for selection of which ad to play.

Description of the Related Art

The basic delivery process of digital video advertisements involves a call and response mechanism. When a video player, running on a desktop PC, mobile device, mobile app, or OTT device has an opportunity to display an ad, it typically requests or calls up the necessary ad data from ad servers. The ad servers respond by sending the data corresponding to the digital video ad to the video player. The number of ad servers involved can vary. A video player may pull data directly from ad servers, such as one controlled by an ad publisher. Alternatively, the video player may call up a supply side platform, which may in turn call a demand side platform, an agency or network ad server to supply the needed information.

An ad server is software and hardware that is used to deliver ads that render digital advertising creatives, manage ad campaigns, store creatives (i.e., an object that contains all the data for visually or video rendering the ad itself), store data about advertising content, and deliver ads to websites and applications. Ad servers are available as hosted services or as self-hosted products. Ad servers are typically used by website publishers, networks and advertisers to help with ad management, campaign management and ad trafficking. An ad server also provides reporting on ads served on websites. First-party ad servers allow publishers to manage inventory (ad space/placements) on their websites, display ads sold via direct deals with advertisers, sell remnant (unsold) inventory to ad networks, ad exchanges, and supply-side platforms (SSPs), and report on ad performance. Third-party ad servers are used by advertisers to store their ads, measure campaign performance across several publishers, and verify metrics against reports from publishers, such as impressions (an impression is a single view of an ad by one individual) and clicks (a mouse click on a part of the ad).

An ad network is a technology platform that serves as a broker between a group of publishers (i.e., supply-side) and a group of advertisers (i.e., demand-side). In ad networks, media buyers typically manually make campaign changes for targeting and optimization. Like an ad network, an SSP automates and optimizes the selling of online media space. Ad networks typically provide advertisers with controlled access to curated and sometimes, exclusive and premium publishers. SSPs, on the other hand, typically offer real-time bidding for advertisers and publishers, dynamically matching them. SSPs typically use programmatic technologies to optimize on behalf of publishers.

Ad mediation is a technology that sends ad requests to multiple SSPs or ad networks to ensure publishers find the best available network to fill their ad slots. First, publishers rank ad networks in order of preference. Second, the mediation platform tries the top ad network. The mediation may be based on selecting ad bids that maximize revenue when filling the ad slots.

A video player is a software application on a user device which plays both digital video content and digital video advertising on the user device. The video may be streamed or on-demand from a remote source such as an ad server. Some video players run on general purpose computing devices (e.g., PCs and smart phones) and others run on special-purpose devices (e.g., set-top boxes). Most contemporary web browsers are compatible with embedded video players, as do many mobile apps, though a video player may be stand-alone application software.

A video player will play videos at the request of the user, but ads are different from user-requested videos and other content because ads are played before, during or after user-requested videos at the behest of an advertiser, rather than the user. Indeed, users sometimes prefer to avoid ads. By definition an ad is content which is played automatically in conjunction with content that the user requests and with the purpose of promoting a brand, service, product or other activity that may or may not be related to the content the user requested to see. When a video player receives an instruction to play an ad (i.e., typically when the player detects an ad opportunity before, during, or after playback of a user-requested video), the ad tag will identify an ad server from which to fetch the ad to play, known as the ad server. However, an ad requested to the ad server may be dynamically redirected to a supply side server. The supply side server is used by an SSP, an ad network or by the buyer of ads to serve creatives, track results and optimize creatives.

An ad tag is a code snippet or URL that invokes an ad server to search for an ad. An ad tag is created and placed for each ad placement. When a video player loads, the video player calls whatever ad tags are configured for its placements. The ad tag gives instructions (i.e., an ad request) to the video player to retrieve the ad from a specified ad server. Although ad tags may take many forms, such as JavaScript or URLs, for video ads ad tags are usually URLs that are invoked and that will return an ad to execute that conforms to the Video Ad Serving Template (VAST) standard. An ad tag may include VAST parameters, and the VAST specification includes several that may be included in a VAST tag:

VMaxd—maximum duration of video accepted, in seconds; VPl—video player frameworks accepted; VHt—expected height of video in pixels; VWd—expected width of video in pixels; VBw—maximum bandwidth of video requested in bits per second; and Vstrm—stream type, 0 for progressive, 1 for streaming.

A digital video ad has at least two components, making up an ad unit—a media file or code file having the advertiser's creative, and metadata which describes the media file and how it should be played. The digital video ad could also return a secondary ad tag to call, causing a chained call from one ad request to another.

The VAST is a standard XML-based ad response template for in-stream video as well as an XML Schema Definition (XSD) for developers. VAST was designed for use with video players that parse the ad response prior to playing the ad. VAST provides a common protocol that enables ad servers to use a single ad response format across multiple publishers and video players. A key to VAST is that the video player can process scripts. VAST supports linear video ads, non-linear video ads and companion ads.

The VAST schema provides a request-response protocol. The video player requests an ad from an ad server, and the ad server responds. The response from the ad server is typically either a single ad in VAST format, a set of ads (ad pod), no ad, or a VAST response that contains a nested VAST response or code for making chained ad server requests.

Online video advertising differs from online display (e.g., static visual image) advertising in many ways. For one, video creative files are significantly larger than display files—on the order of hundreds of times larger. And while display ads usually can be placed and shown on any browser, video ads require a video player in order to be viewed. The advertiser's creative must be compatible with the end user's video player. Other compatibility prerequisites for video include device and operating system, bandwidth and screen/player resolution. This makes video advertising very sensitive to technical glitches and incompatibility issues.

In a standard ad bidding scenario, several demand sources are called to make a bid. Then, a decisioning engine utilized by the publisher selects a winner. After the winning source is chosen, its VAST/VPAID tag is transferred to the user's video player to run the ad. However, in many cases, the ad will not play back successfully, and the impression will be lost. Quite often the ad does not even start to play because of a technical failure, such as a technical compatibility mismatch between the creative and the video player, or a lack of response from a required third party service prior to ad delivery.

In the case of video advertising, advertisers (i.e., demand sources) commit to paying for an impression only after the video ad starts playing, as evidenced by the firing of a 'start pixel'. This means that if a video ad failed to start for any reason the website publisher will not get paid. Technical failures and arbitrage plays can significantly impede the website publisher's revenue because of these lost impressions, or unmonetized ad opportunities. Where demand sources have bid for a particular advertising opportunity, when a video ad fails to start, the losing bidders are also harmed because they have lost an impression opportunity, and expended resources to make a bid. Other participants in the ecosystem are injured through this inefficiency.

The video player is responsible for "Playing the Media" in the VAST for the ad; and once play has commenced, the video player is also responsible for calling the code/image in the "start" VAST event (or start pixel firing) signifying the playback of the ad on the intended device has indeed started. Start pixels typically have embedded code for notifying the source of the start pixel that it was displayed. Because tracking pixels usually are not visible to the user, they are usually said to be fired, not displayed.

The solutions for technical flaws in digital video advertising have included improvement of video players, and improved delivery of creatives to the video players through improved data communications network infrastructure.

Throughout this description, elements appearing in figures are assigned three-digit reference designators, where the most significant digit is the figure number and the two least significant digits are specific to the element. An element that is not described in conjunction with a figure may be presumed to have the same characteristics and function as a previously-described element having a reference designator with the same least significant digits.

DETAILED DESCRIPTION

The disclosed platform predicts whether digital video advertisements will start playing, and uses these predictions to select one of them to deliver to a user device. Benefits may include improved (increased) ad start rate, reduced ad start time (latency), and increased measured viewability (which is a function of time, among other things). These benefits may lead to increased ad revenues, ad prices and advertiser performance.

Figure 1:
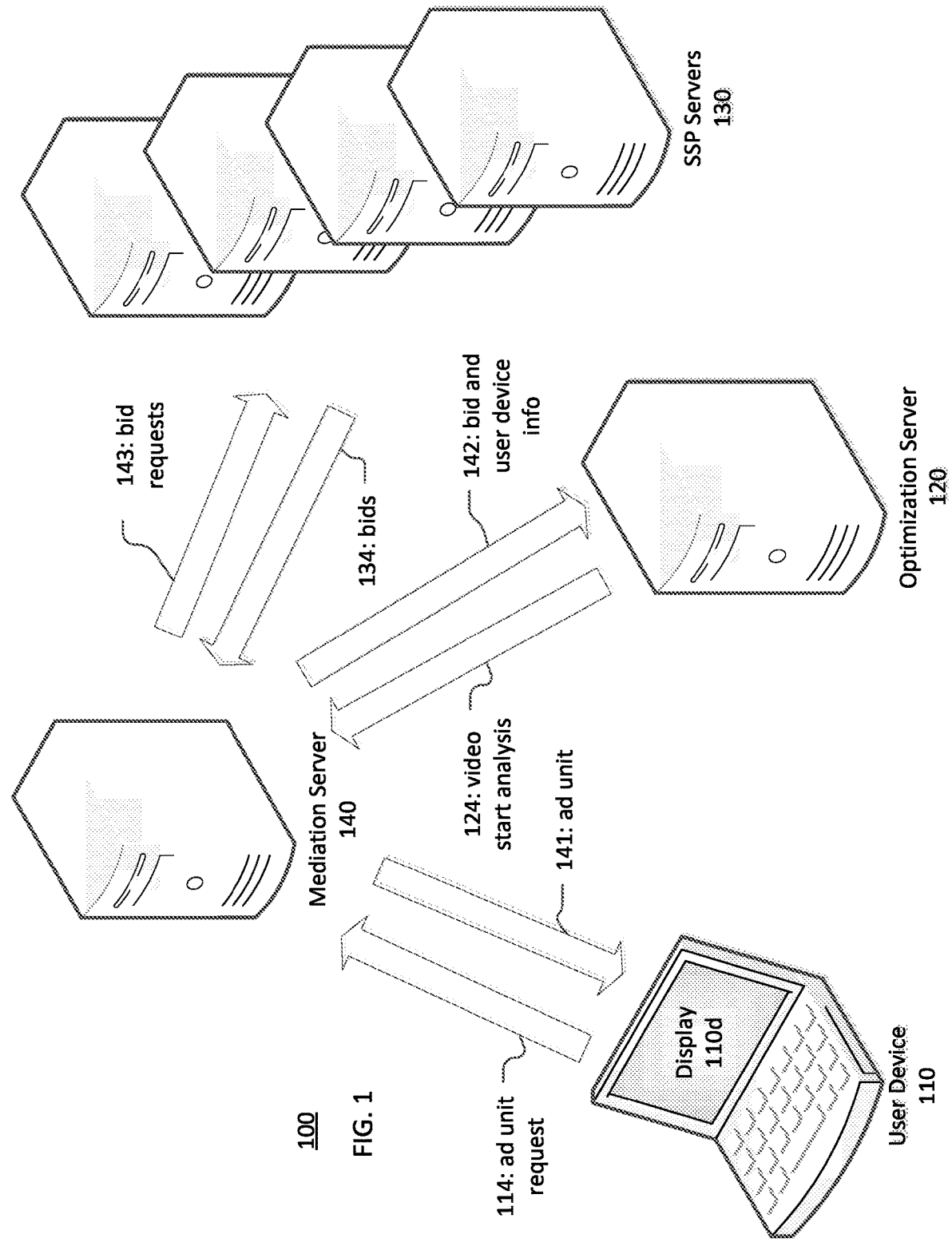
FIG. 1 is a general system block diagram of a video delivery environment.

Referring now to FIG. 1 there is shown a general block diagram of a system 100 for serving digital video advertisements (ads). The system includes a user device 110, an optimization server 120, a mediation server 140, and a number of SSP servers 130. These devices 110, 120, 130, 140 communicate via digital data networks (not shown), such as the Internet, local area networks (LANs), and/or private data networks. The optimization server 120, the SSP servers 130 and the mediation server 140 are servers and may be representative of software running on a processor. Each of the SSP servers 130 is an ad server. The mediation server 140 may be the publisher's primary ad server.

The user device 110 is a computing device adapted for direct use by a human and includes a human user interface. The user device 110 may be, for example, a desktop personal computer (PC), a laptop or other personal computer, a tablet, a smartphone or other mobile device, a set top box, video game system, a CTV device, or an OTT application. The user device 110 includes a video player (not shown) which can cause video to be displayed on a display 110d which is either part of the user device 110 or connected to the user device 110. The user device 100 also includes a data network interface (not shown) for accessing the digital data network.

FIG. 1 also shows a general flow of processing in the system 100, represented by flows 114, 141, 143, 134, 124, 142. The numbering of these flows is based upon the reference numbers of the data source and the data destination, and in particular the tens and ones digits of those reference numbers. In the flows, the tens digit identifies the data source (e.g., 114 comes from the user device 110) and the ones digit identifies the data destination (e.g., 114 goes to the mediation server 140).

In flow 114, the user device 110 sends a request for an ad unit to the mediation server 140. The ad request may be from a video player in the user device 110 or from other software which will cause the digital video ad to be played by the video player in the user device 110. The ad request may be specified by a VAST ad tag. In flow 141, the mediation server 140 responds to the request 112 with an ad unit.

The mediation server 140 may select the ad unit for the user device through an auction, such as through header bidding. In header bidding, also known as parallel ad bidding, the website publisher simultaneously offers ad space to numerous SSPs and/or ad exchanges. In flow 143, the mediation server 140 requests bids from the SSP servers 130. In flow 134, the SSP servers 130 send their bids to the mediation server 140. The information of the bids may include an identification of the bidder, an identification of an ad unit to be played if the bid is accepted, and a bid price.

After collecting the bids, the optimization server 120 is queried in flow 142 for analysis of the bids from those received in flow 134. Though the query is shown as coming from the mediation server 140, it may be a different component, such through clearing an auction (e.g., a prebid wrapper, a prebid server, a prebid client or other auction clearing mechanism). The query includes the bid information and information about and/or identification of a designated user device to which the winning digital video ad will be served. The designated user device may be identified, for example, through a MAC address, and IP address or a logical designator. Flow 142 may also include placement information. Placement describes how a website publisher arranges for the digital video ad to be placed on-screen. Placement may be at the top, middle or bottom of a window. Placement may be on the left, center or right of a window. Placement may be in a frame which is partially hidden, fully hidden or fully on top of other frames. The placement information may include a specific web page where the digital video ad will be played, or more generally the website where the digital video ad will be displayed.

In flow 124, the optimization server 120 responds with its video start analysis. The video start analysis may include predicted values of the bids. These predicted values may be used by the publisher to determine which bid to accept. The video start analysis may be used by the mediation server, the publisher and/or the publisher's ad server in VAST responses.

After the mediation server 140 selects a winning bid, in flow 134, the mediation server delivers the ad unit of the winning creative where provided by the winning SSP server 130 to the user device 110. The ad unit may be provided by the winning SSP server 130, though the ad unit may be sent by the mediation server 140 or another source.

Figure 2:
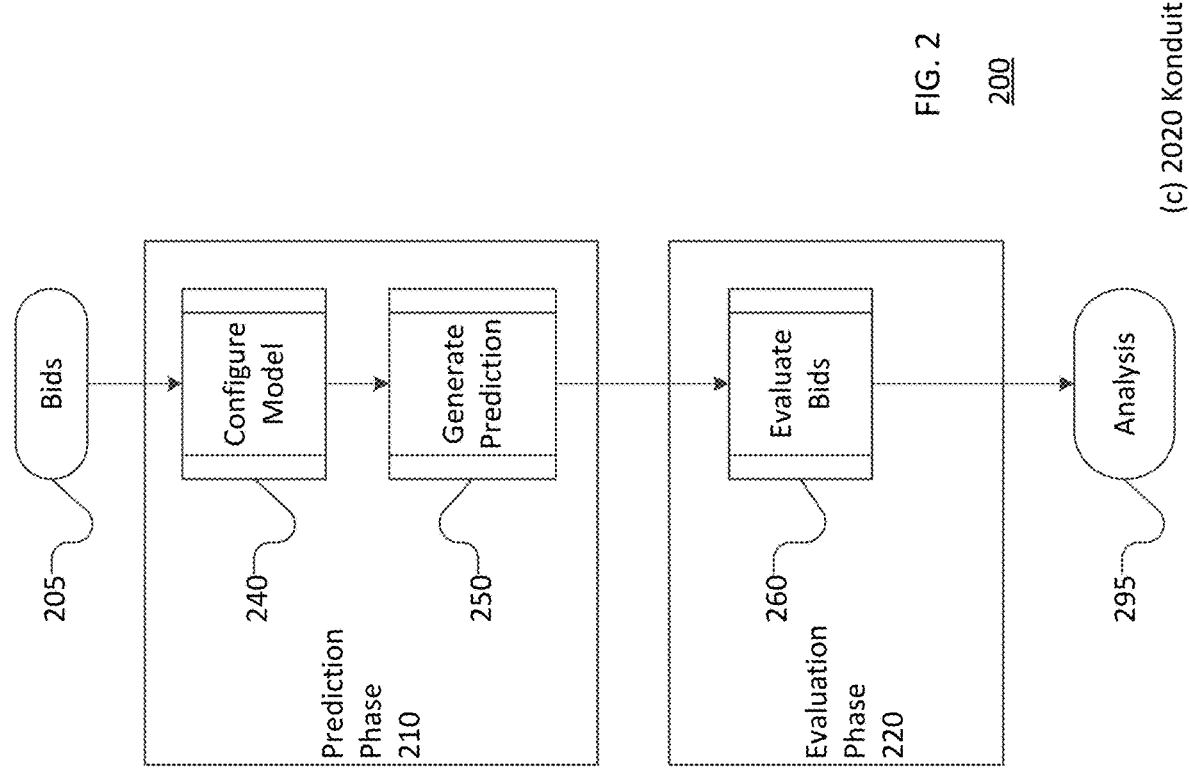
FIG. 2 is a flowchart of a process for digital video ad analysis.

Referring now to FIG. 2 there is shown a flowchart of a process 200 for digital video ad analysis. The process 200 may be performed by the optimization server 120. Thus, the process 200 receives the data of flow 142 and responds with its video start analysis 124. The process 200 may be run concurrently for a number of designated user devices, which itself may be a method for assessing the best match between bids and user devices based upon technical qualities of the respect ad units and user devices.

The process 200 has two phases, a prediction phase 210 and an evaluation phase 220. In the prediction phase 210, the optimization server uses the user device information, as well as browser, operating system, and user specific information, and the ad unit information from each bid to predict the likelihood of whether the digital video ads specified by the corresponding ad units will start on the designated user device. In the evaluation phase 220, the optimization server uses the bid information and the predictions to assign a predicted bid value for each bid response to be evaluated for selection by the ad server.

The process 200 may occur in time to allow serving digital video ads operating in real-time, i.e., less than 300 milliseconds. For this reason, the process 200 should receive and process and evaluate bids in less than 200 milliseconds, though it has been found that less than 100 milliseconds provides better overall performance. Because the number of bids has some correlation to processing time/bid selection, it may be necessary to balance processing time with bid quantity. Furthermore, there may be a minimum number of bids, such as five or twenty, or a bid price difference, required to justify use of the predictive model.

The process 200 may be performed long in advance (e.g., on the order of minutes) of when the content requested by the user is needed. For example, in the case of SSAI/ad stitching for OTT, evaluation of bids and selection of a digital video ad to be played could occur minutes ahead of actual playback.

The prediction phase 210 has a first step 240 in which a predictive model is configured to model the designated user device. The designated user device may be specified through its type, its operating system and its browser. The type of user device may be a broad category such as a desktop PC, a laptop PC, mobile phone, a tablet or OTT device, or may be more specific, such as a Dell XPS laptop having an 11" screen, an Intel i5-8265U processor operating at 1.60 GHz and 8 GB RAM, or an Apple iPhone 8 having 256 GB of memory capacity. The operating system may be a general designation, such as Microsoft Windows, Apple iOS or Google Android, or more specific such as Windows 10 Pro or iOS 13.6. The browser designation may be general such as Microsoft Edge, Apple Safari or Google Chrome, or more specific such as a particular version of the browser. In addition to or in lieu of the browser designation there may be a designation of the user device's video player. For example, a browser may have an integrated or predefined video player. If the user device does not have a browser, the designation of video player may be necessary. Where the user device has multiple video players, the user device's default video player may be designated, or the default video player for a particular video file format.

Configuration of the predictive model includes adapting the predictive model to produce a prediction of whether a given digital video ad will start playing on the designated user device. The technical requirements of the type of user device, its operating system, its browser and its video player have been found to be significant in making this kind of prediction because ad starts usually fail due to technical problems, such as a technical compatibility mismatch between the digital video ad and the technical capabilities of the user device. Additionally, creative-specific elements, such as calls made to third party services, have been found to be important in predicting the likelihood of a digital video ad to start. These calls may be, for example, error tracking resources, tracking pixels, scripts or document references.

The predictive model may also utilize actual time of video ad request. This time request may be characterized as a time period or slot. The time of play may be an hourly designation, such as the 8 am hour or the 4 pm hour. The time of play could be a more generalized time of day, such as morning, afternoon, evening, or late night. The time of play could be more or less granular.

After the predictive model is configured 210, in step 250 the predictive model is used to predictively test whether the digital video ads which were bid from the ad servers will start. Thus, for each of the plurality of digital video ads designated by the ad unit information, the predictive model generates a prediction of whether the digital video ad will start on the designated user device. The predictive model may generate these predictions serially, in parallel/concurrently or otherwise. The prediction may be a binary yes/no assessment or may be a probability.

The predictive model may also generate a confidence factor of the prediction which is a certainty of correctness of the prediction. For example, a Bayesian model may be used where each prediction also includes a confidence interval as part of the prediction.

To generate the prediction for a given digital video ad, the predictive model measures and observes a start of play by the designated user device of the given digital video ad and monitors the resulting behavior of the predictive model. The predictive model utilizes metadata of the given digital video ads, which moots a need to actually play the digital video ad because starting play of a digital video ad can be an unacceptably long time-consuming process. The metadata may include an identification of the given digital video ad (e.g., creative ID), a VAST URL to serve, placement, and past performance data. Past performance data may be with respect to the given digital video ad, with respect to the bidder, with respect to digital video ads which are similar to the given digital video ad. Past performance data may be with respect to the designated user device, or with respect to user devices in general having selected characteristics which are the same or similar to those of the designated user device. The past performance data may include successful starts, unsuccessful starts and other errors.

The predictive model may have a number of dimensional branches spanning from a most specific dimensional branch to a least specific dimensional branch. The dimensional branches may be associated with a performance statistic, and in particular start rate. To generate the prediction, the predictive model starts from the most specific dimensional branch and moves downward toward the least specific dimensional branch of the predictive model until the respective dimensional branch of the predictive model has sufficient data to produce the prediction. As the predictive model moves down the dimensional branches, if the dimensional branch under consideration does not have enough data to trigger a prediction, the predictive model falls back to a lower dimensional branch with a lower data dependency.

The dimensional branches may have respective thresholds defined by volume and time, such as of past performance data for the given digital video ad or bidder. If none of the thresholds of the dimensional branches are satisfied the model may use a set number for the prediction. Thresholds may be calculated dynamically as a gradient descent, in which, for a given branch, some of the data would be used for the modeling, some would be held back, and then would be used to see what the model would have predicted. This allows the accuracy of the model to be set, with such accuracy designated as arbitrary thresholds (e.g., it needs to be better than X) before the respective branch is active.

The most specific dimensional branch of the predictive model may utilize all of the information passed to the optimization server from the SSP: bid information, ad unit information and user device information. The least specific dimensional branch of the predictive model has only an identification of the bidder and identification of the digital video ad, and no information about the user device. Moving from the most specific dimensional branch to the least specific dimensional branch, the dimensional branches may use, in order and cumulatively, browser type and/or video player type, operating system type, user device type.

In the evaluation phase 220 the bids associated with the digital video ads are evaluated. In the evaluation step 260, an adjusted value is determined for the digital video ads processed in the prediction phase 210. To evaluate a bid, the optimization server uses the bid price and the start prediction. The adjusted value may be a discount of a bid amount associated with the digital video ad. The discount may be the video start prediction. For example, a 100% prediction that the digital video ad will start would result in no discount, a 50% prediction that the digital video ad will start would result in a 50% discount, and a prediction that the digital video ad will not start would result in a discount to zero. Though this example is a linear discount, the discount may be non-linear. The confidence factor may also be used. The optimization server may also rank the adjusted bid values to make a selection. The selection may be one specific bid or may be a ranking or other evaluation returned so that the winning bid may be selected. The adjusted bids are reported as video start analysis 295 to the mediation server 140 in flow 124. Reporting may be done on sequentially or in bulk. Based on the video start analysis form the optimization server 120, the mediation server 140 decides which of the bids of flow 134 to request from the SSP servers 130 as the winner.

When the designated user device attempts to play a given digital video ad unit, a performance report may be provided to the optimization server 140 to improve the predictive model. This performance report may include whether the given digital video ad started on the designated user device.

Process 200 may include updating (e.g., reconfiguring) a machine-learned predictive model at step 240 using the information in flows 142, predictions of step 250, evaluations of step 260 and selected bids of step 270. These updates may include updating based on information for multiple user devices 110.

Figure 3:
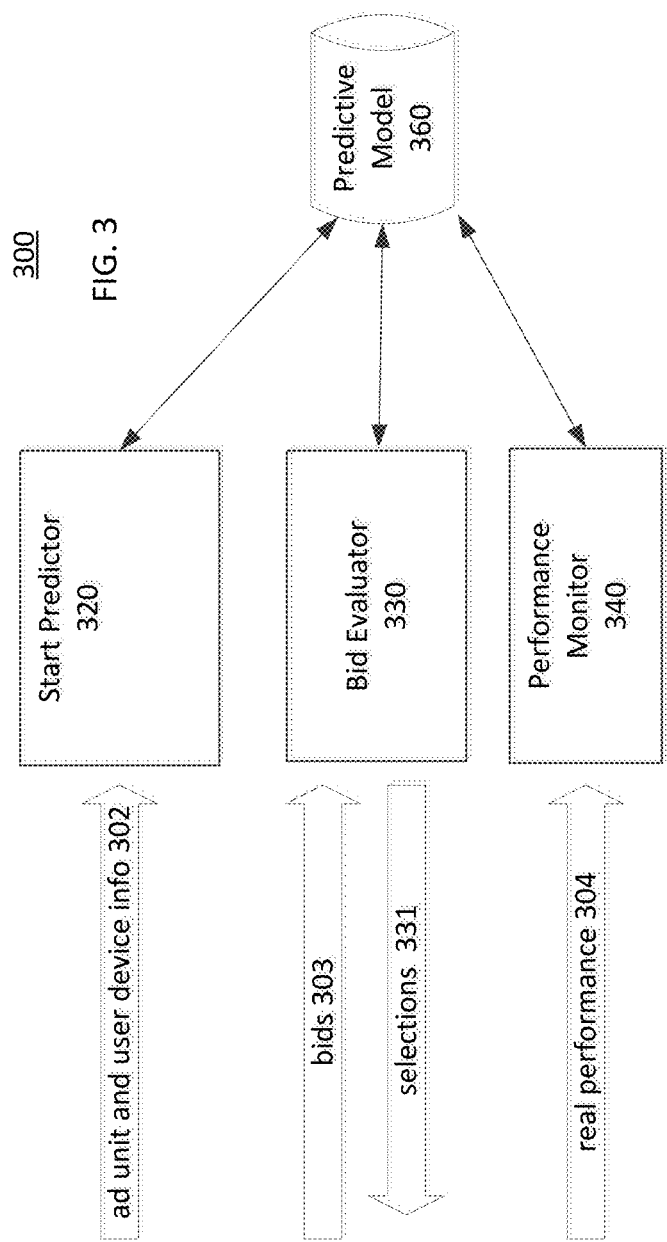
FIG. 3 is a system block diagram showing details of an optimization server.

Referring now to FIG. 3 there is shown a system block diagram showing details of an optimization server 300 which may be the optimization server 120 (FIG. 1). The optimization server 300 has a start predictor service 320, a bid evaluator service 330, a performance monitoring service 340 and a predictive model 360. The services 320, 330, 340 and model 360 may represent software running on a processor. The start predictor service 320 corresponds to the prediction phase 210 (FIG. 2). The bid evaluator service 330 corresponds to the evaluation phase 220 (FIG. 2). The performance monitoring service 340 receives the real performance reports 304 of specific digital video ads on specific user devices, such as using performance reports of process 200.

The optimization server 300 may be a machine learning system. Machine learning based upon past uses of the predictive model 360 for the same and similar data, both bid data and user device data, may be used to train the predictive model 360. This training may be done prior to a first use of the predictive model 360, with training continuing based upon use of the predictive model 360 and from outside performance metrics. The predictive model 360 may receive continued or updated training using performance reports 304.

Thus, the process of FIG. 2 and/or operation of server 300 may be performed by applying the machine-learned predictive model 360 to the ad unit and user device info 302. The ad selector 330 uses the bids 303 and the predictions in a bid evaluator 335 to produce the selections 331. The information 302 and bids 303 may correspond to flow 142; and selections 331 may correspond to flow 124.

Though start of play is an important performance metric, in addition to or instead of start of play the following digital video ad play performance metrics may be used: play of the entire digital video ad, quartile completion, whether play was interrupted, how much of the digital video ad played, cause of interruption of play, and user interaction with the digital video ad (e.g., click-through).

In addition to aiding in bid selection, the predictive model may be used in other ways, such as by advertisers and SSPs to improve their ad units, bids and tags. In this environment, real-time operation may be unimportant. Instead, the predictive model is used to test a variety of digital video ads so that the advertiser, demand side platform or other party may select which to bid. This can also help advertisers and others to refine their digital video ads and bids to improve likelihood of selection and likelihood of start of play.

Figure 4:
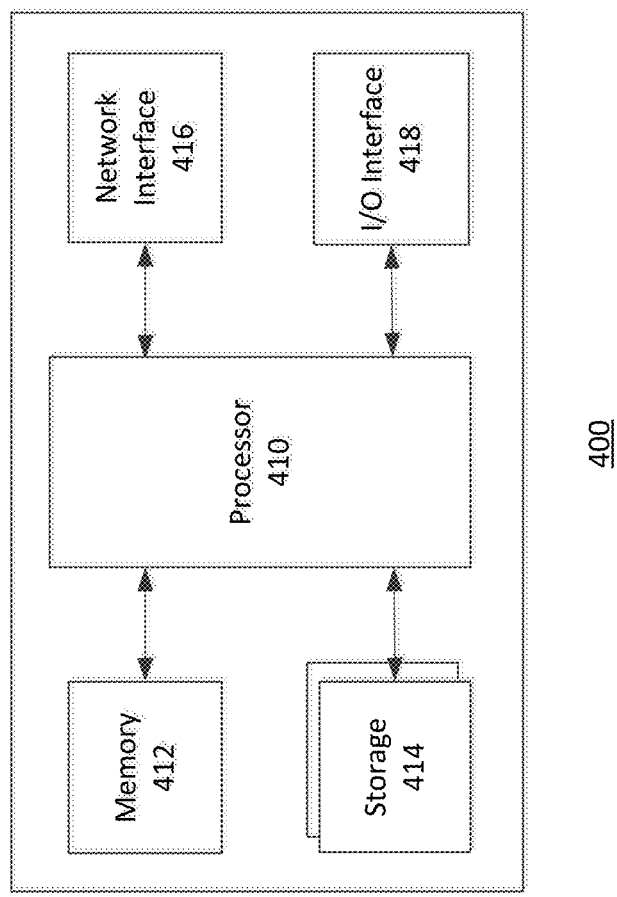
FIG. 4 is a block diagram of a computing device.

Referring now to FIG. 4 there is shown a block diagram of a computing device 400. The computing device 400 may be representative of the devices shown in FIG. 1—the user device 110, the optimization server 120, the SSP servers 130 and the mediation server 140. The device 400 may be optimization server 120 or 300. The computing device 400 may be a desktop or laptop computer, a server computer, a client computer, a network router, a network node, a tablet, a smartphone or other mobile device. The computing device 400 may include software and/or hardware for providing functionality and features described herein. The computing device 400 may therefore include one or more of: logic arrays, memories, analog circuits, digital circuits, software, firmware and processors. The hardware and firmware components of the computing device 400 may include various specialized units, circuits, software and interfaces for providing the functionality and features described herein. For example, device 400 may include a configuring unit to configure a prediction model to predict whether a given digital video ad will start playing through a video player on a specific user device; and a predictive unit for predicting whether a selected one of a plurality of digital video ads will start on the specific user device as noted herein.

The computing device 400 has a processor 410 coupled to a memory 412, storage 414, a network interface 416 and an I/O interface 418. The processor 410 may be or include one or more microprocessors, field programmable gate arrays (FPGAs), application specific integrated circuits (ASICs), programmable logic devices (PLDs) and programmable logic arrays (PLAs).

The memory 412 may be or include RAM, ROM, DRAM, SRAM and MRAM, and may include firmware, such as static data or fixed instructions, BIOS, system functions, configuration data, and other routines used during the operation of the computing device 400 and processor 410. The memory 412 also provides a storage area for data and instructions associated with applications and data handled by the processor 410. As used herein the term "memory" corresponds to the memory 412 and explicitly excludes transitory media such as signals or waveforms.

The storage 414 provides non-volatile, bulk or long-term storage of data or instructions in the computing device 400. The storage 414 may take the form of a magnetic or solid state disk, tape, CD, DVD, or other reasonably high capacity addressable or serial storage medium. Multiple storage devices may be provided or available to the computing device 400. Some of these storage devices may be external to the computing device 400, such as network storage or cloud-based storage. As used herein, the terms "storage" and "storage medium" correspond to the storage 414 and explicitly exclude transitory media such as signals or waveforms. In some cases, such as those involving solid state memory devices, the memory 412 and storage 414 may be a single device.

The network interface 416 includes an interface to a network such as a network that can be used to communicate calls, signals, streams, arrays, flagged samples and feedback described herein. The network interface 416 may be wired or wireless.

The I/O interface 418 interfaces the processor 410 to peripherals (not shown) such as displays, video and still cameras, microphones, keyboards and USB devices.

In some cases, storage 414 is a non-volatile machine-readable storage medium that includes all types of computer readable media, including magnetic storage media, optical storage media, and solid state storage media. The software can be installed in and sold with the optimization server 120. Alternatively, the software can be obtained and loaded into the optimization server 120, including obtaining the software via a disc medium or from any manner of network or distribution system, including from a server owned by the software creator or from a server not owned but used by the software creator. The software can be stored on a server for distribution over the Internet.

The technologies described herein provide various technological improvements to computer performance and efficiently. For example, the system 100, the optimization server 120, the process 200, and/or the computing device 300 more quickly and efficiently render and/or execute video ads. They also provide more impressions for the ads as more ads with be rendered using them.

Within this description, the term unit also means a collection of hardware, firmware, and/or software, which may be on a larger scale than an engine. For example, a unit may contain multiple engines, some of which may perform similar functions in parallel. The terms engine and unit do not imply any physical separation or demarcation. All or portions of one or more units and/or engines may be collocated on a common card, such as a network card 416, or within a common FPGA, ASIC, or other circuit device.

The techniques may be implemented with machine readable storage media in a storage device included with or otherwise coupled or attached to a computing device. That is, the software may be stored in electronic, machine readable media. These storage media include magnetic media such as hard disks, optical media such as compact disks (CD-ROM and CD-RW) and digital versatile disks (DVD and DVD±RW); flash memory cards; and other storage media. As used herein, a storage device is a device that allows for reading and/or writing to a storage medium. Storage devices include hard disk drives, DVD drives, flash memory devices, and others.

CLOSING COMMENTS

Throughout this description, the technologies described and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one technology are not intended to be excluded from a similar role in other technologies.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A method of video ad evaluation comprising:
   evaluation a likelihood of whether each of a plurality of digital video ads will start on a single specific user device having a video player, comprising:
   configuring a predictive model to model the specific user device, wherein the predictive model is adapted to produce a prediction of whether a given digital video ad will start playing through the video player on the specific user device;
   for each of the plurality of digital video ads, generating from the predictive model a prediction of whether a selected one of the plurality of digital video ads will start on the specific user device, wherein generating the prediction comprises simulating in the predictive model of the specific user device a start of play of the selected one of the plurality of digital video ads, monitoring behavior of the predictive model and determining if the start of play of the selected one of the plurality of digital video ads occurs in the predictive model of the specific user device, wherein:
   the predictive model comprises a plurality of dimensional branches spanning from a most specific dimensional branch to a least specific dimensional branch;
   generating the prediction comprises starting from the most specific dimensional branch of the predictive model and moving downward toward the least specific dimensional branch of the predictive model until the respective dimensional branch of the predictive model has sufficient data to produce the prediction.

2. The method of claim 1 wherein configuring the predictive model includes setting a type of the specific user device, an identification of an operating system installed on the specific user device, and a type of video player installed on the operating system.

3. The method of claim 1 wherein the predictive model utilizes past performance data, the past performance data including past performance of other digital video ads on the specific user device.

4. The method of claim 1 wherein the specific user device is associated with a unique identifier of the specific user device.

5. The method of claim 1 wherein the plurality of digital video ads consists of at least five digital video ads.

6. The method of claim 1 further comprising predicting ad starts for the plurality of ads concurrently.

7. The method of claim 1 comprising, prior to the simulating, receiving bids for the digital video ads.

8. The method of claim 1 wherein real-time comprises less than 50 milliseconds.

9. The method of claim 1 wherein generating from the predictive model includes generating a confidence factor of the prediction comprising a certainty of correctness of the prediction.

10. The method of claim 1 performed in real time, wherein real time is less than 300 milliseconds.

11. The method of claim 3 further comprising receiving a performance report from the specific user device showing whether the digital video ad ran, and using the performance report to improve the predictive model.

12. An apparatus comprising a video ad start prediction server comprising a non-volatile machine-readable medium storing a program having instructions which when executed by a processor will cause the processor to predict if a digital video ad will start playing, the instructions of the program for:
   evaluation a likelihood of whether each of a plurality of digital video ads will start on a single specific user device, comprising:
   configuring a predictive model to model the specific user device, wherein the predictive model is adapted to produce a prediction of whether a given digital video ad will start playing through the video player on the specific user device;
   for the each of the plurality of digital video ads, generating from the predictive model a prediction of whether a selected one of the plurality of digital video ads will start on the specific user device, wherein generating the prediction comprises simulating in the predictive model of the specific user device a start of play of the selected one of the plurality of digital video ads, monitoring behavior of the predictive model and determining if the start of play of the selected one of the plurality of digital video ads occurs in the predictive model of the specific user device, wherein:
   the predictive model comprises a plurality of dimensional branches spanning from a most specific dimensional branch to a least specific dimensional branch;
   generating the prediction comprises starting from the most specific dimensional branch of the predictive model and moving downward toward the least specific dimensional branch of the predictive model until the respective dimensional branch of the predictive model has sufficient data to produce the prediction.

13. The apparatus of claim 12 wherein configuring the predictive model includes setting a type of the specific user device, an identification of an operating system installed on the specific user device, and a type of video player installed on the operating system.

14. The apparatus of claim 12 wherein the predictive model utilizes past performance data, the past performance data including past performance of other digital video ads on the specific user device.

15. The apparatus of claim 12 wherein the specific user device is associated with a unique identifier of the specific user device.

16. The apparatus of claim 12 wherein the plurality of digital video ads consists of at least five digital video ads.

17. The apparatus of claim 12 further comprising predicting ad starts for the plurality of ads concurrently.

18. The apparatus of claim 12 comprising, prior to the simulating, receiving bids for the digital video ads.

19. The apparatus of claim 12 wherein real-time comprises less than 50 milliseconds.

20. The apparatus of claim 12 wherein generating from the predictive model includes generating a confidence factor of the prediction comprising a certainty of correctness of the prediction.

21. The apparatus of claim 12 performed in real time, wherein real time is less than 300 milliseconds.

22. The apparatus of claim 14 further comprising receiving a performance report from the specific user device showing whether the digital video ad ran, and using the performance report to improve the predictive model.

* * * * *